Nov. 28, 1939.  M. D. TRUESDALE  2,181,674
FRUIT PEEL PRESS
Original Filed Aug. 24, 1936  8 Sheets-Sheet 1

Inventor
MELVILLE D. TRUESDALE

By Semmes & Semmes
Attorneys

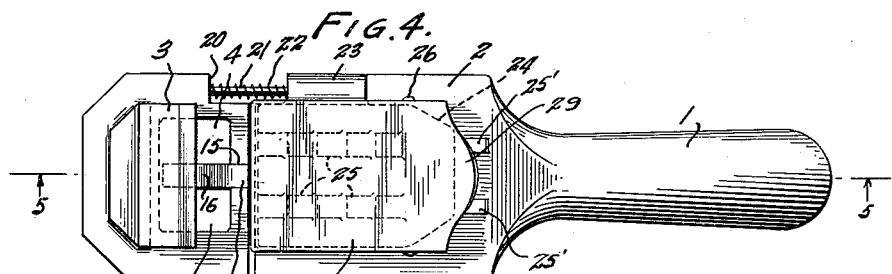
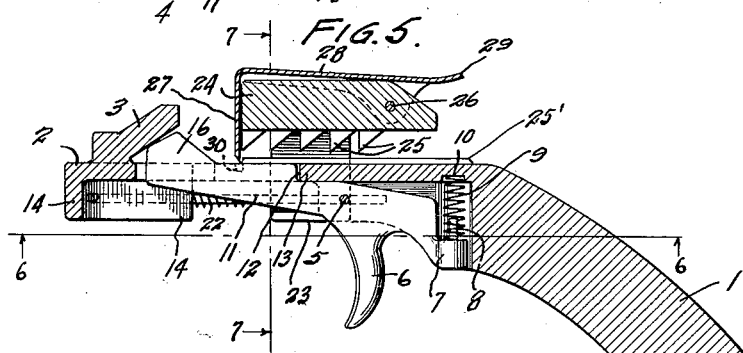
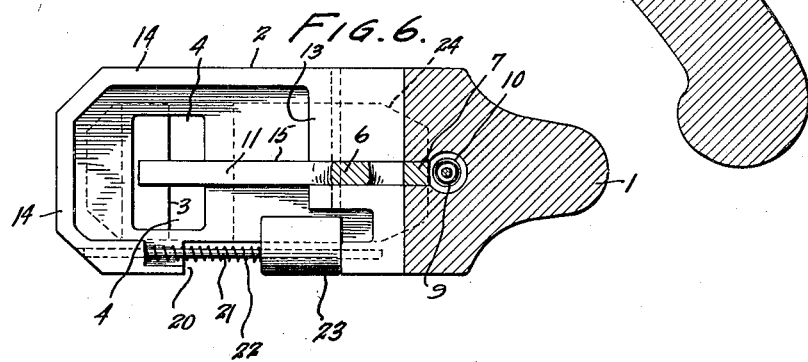
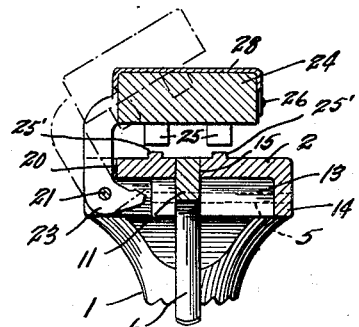

Nov. 28, 1939.　　　M. D. TRUESDALE　　　2,181,674
FRUIT PEEL PRESS
Original Filed Aug. 24, 1936　　　8 Sheets-Sheet 3
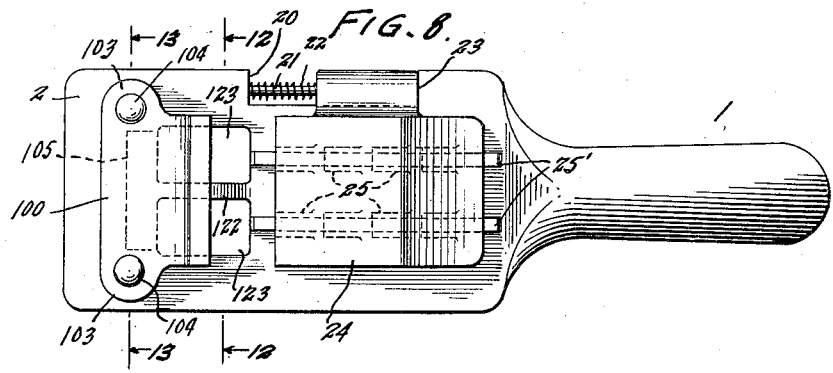
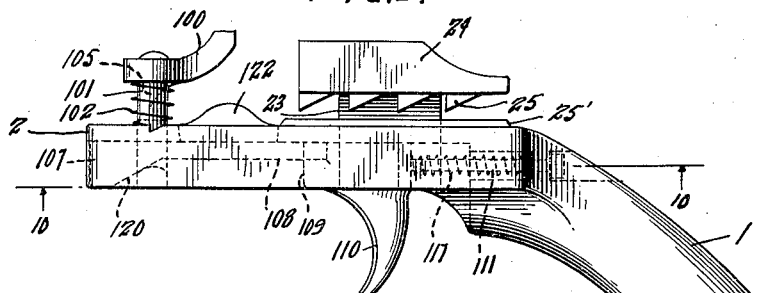
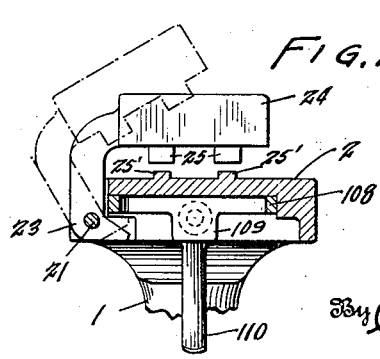
Inventor
MELVILLE D TRUESDALE
By Semmes & Semmes
Attorneys Nov. 28, 1939.  M. D. TRUESDALE  2,181,674
FRUIT PEEL PRESS
Original Filed Aug. 24, 1936   8 Sheets-Sheet 4

Inventor
MELVILLE D. TRUESDALE

By Semmes & Semmes
Attorneys

Nov. 28, 1939.   M. D. TRUESDALE   2,181,674
FRUIT PEEL PRESS
Original Filed Aug. 24, 1936   8 Sheets-Sheet 5

Inventor
MELVILLE D. TRUESDALE

By Semmes & Semmes
Attorneys

Nov. 28, 1939.  M. D. TRUESDALE  2,181,674
FRUIT PEEL PRESS
Original Filed Aug. 24, 1936   8 Sheets-Sheet 6
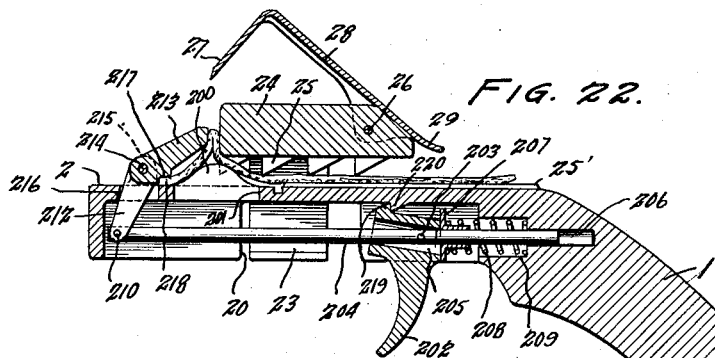
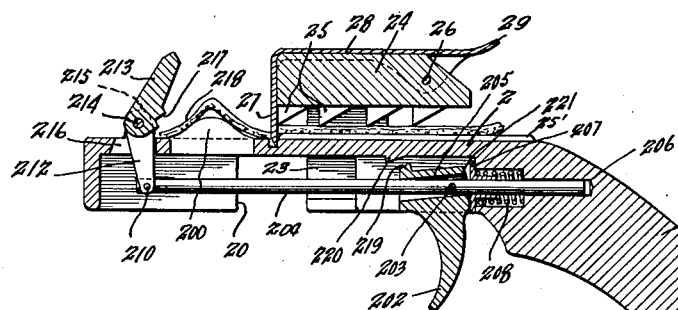
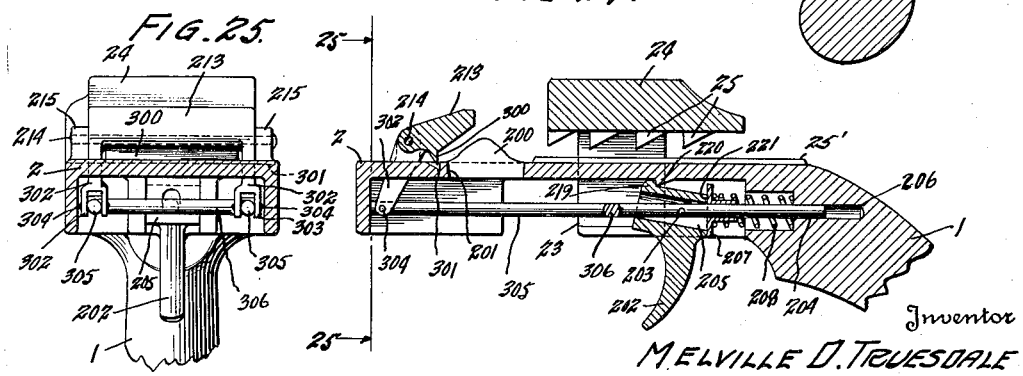
Inventor
MELVILLE D. TRUESDALE
By Semmes & Semmes
Attorneys

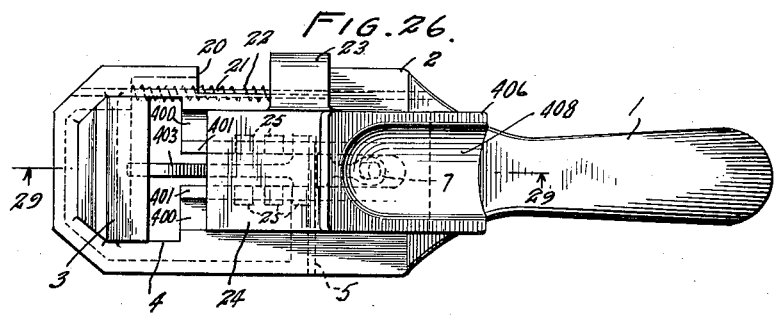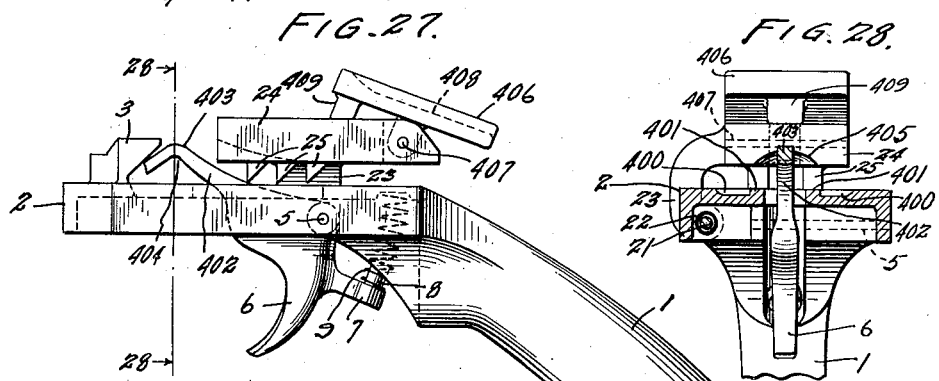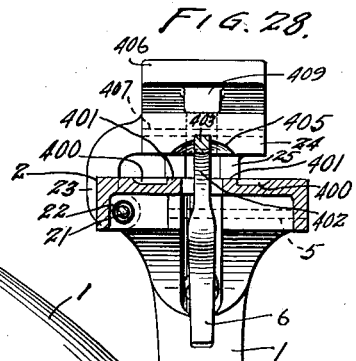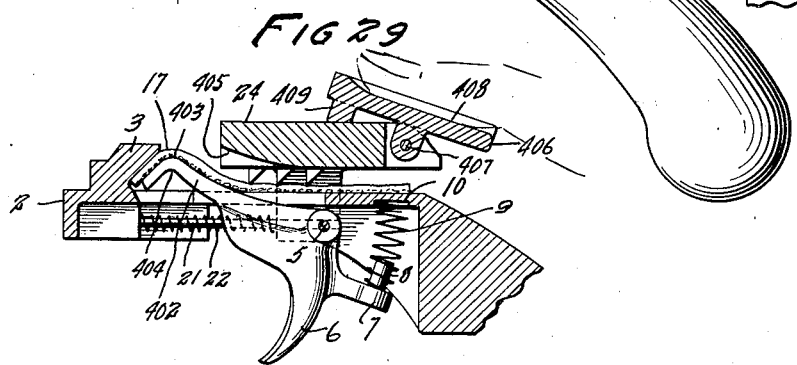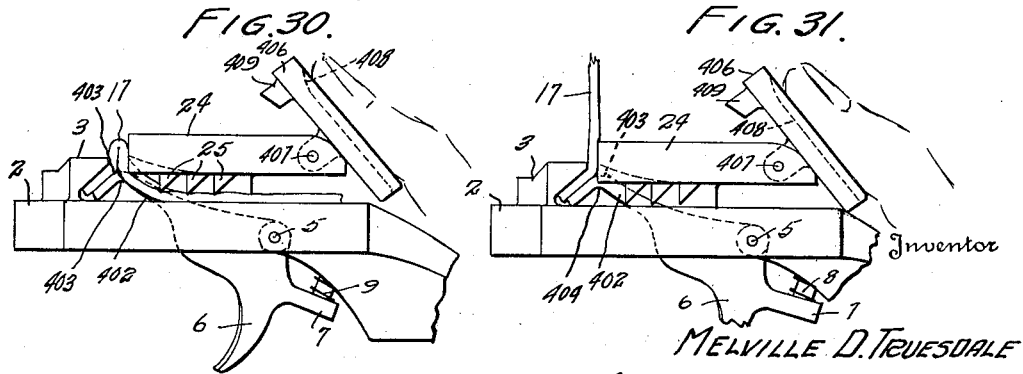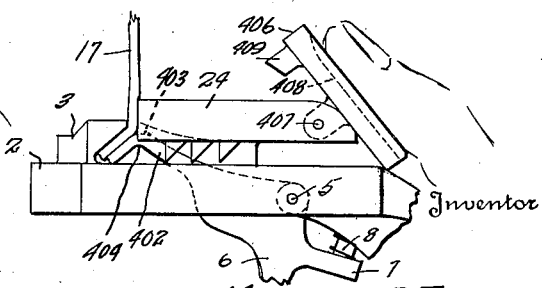

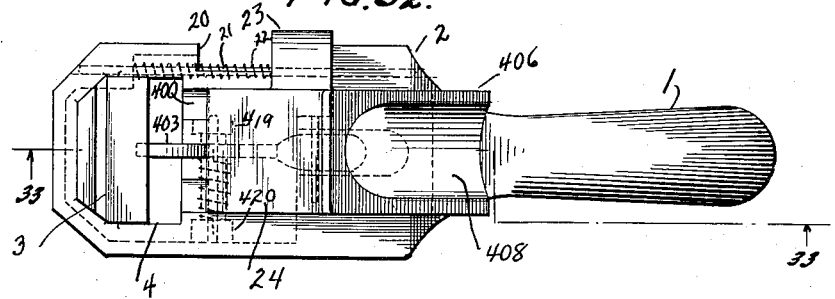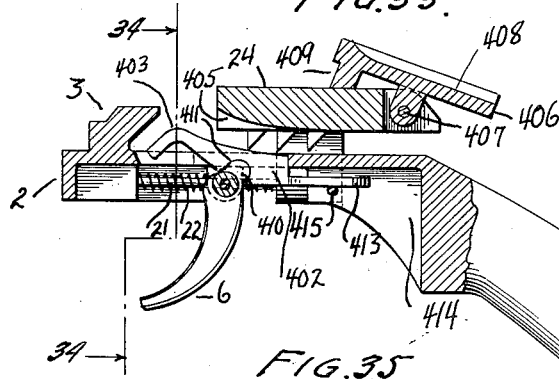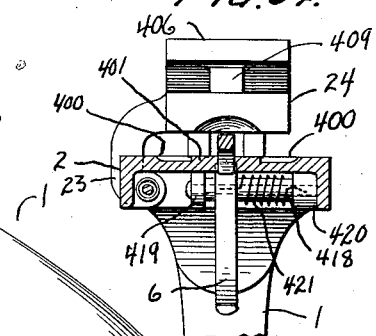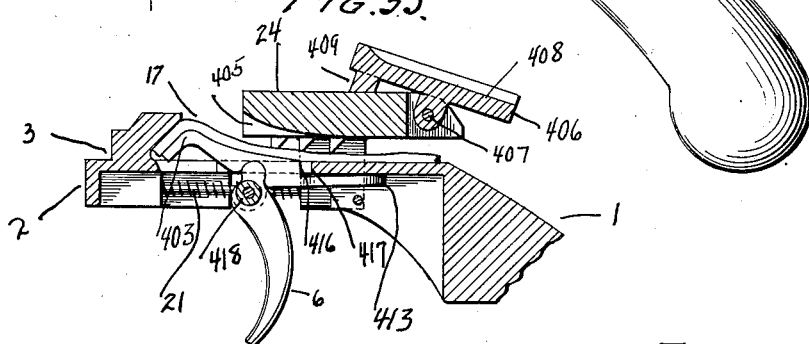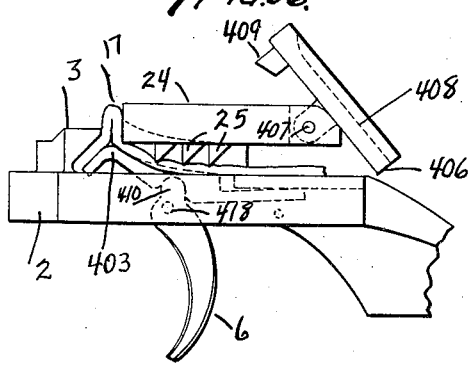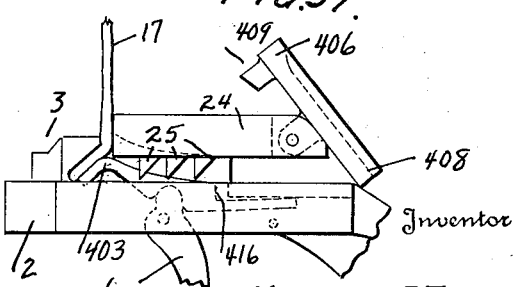

Patented Nov. 28, 1939

2,181,674

UNITED STATES PATENT OFFICE 2,181,674

FRUIT PEEL PRESS

Melville D. Truesdale, Greenwich, Conn.

Application August 24, 1936, Serial No. 97,700
Renewed September 26, 1939

2 Claims. (Cl. 87—28)

My invention relates to a device for expressing essential oils from the skin of fruit. While it is customary to flavor certain beverages, such as tea, cocktails, etc. with the oil expressed from the skin of fruit such as lemons, oranges, etc., heretofore this has been done by pinching or squeezing the peel or skin between the fingers—an inadequate and unsatisfactory procedure.

This device makes it possible to express the greatest amount of natural oils from the skin or peel and impart the flavor or odor of the fruit or vegetable oil to the beverage or solid edible substance with a minimum of effort, and with a minimum amount of contact with the human hand, and to direct the particles of oil as desired, which is not possible with any other method.

It should be clearly understood that this device is not used for extracting the juice contained within the skin, but is used to express the oils contained in the skin or peel after the peel has been cut off the fruit itself.

Whereas it is now customary in flavoring certain beverages to bruise the skin, thus bringing some of the oil to the surface of the skin and then immersing the bruised skin or peel in the beverage, and whereas in the case of certain solid foods such as cakes or pies, the skin or peel is grated or mashed up to release the contained oils and the grated or mashed pieces are inserted in and become a part of the batter or mix from which the finished product is made, with this device it is possible to transmit the oils which contain the flavor and odor without the skin or peel originally containing the oil being mixed with or becoming a part of the substance being flavored or scented. This invention therefore overcomes a condition which in many cases may be objectionable.

I have found that one of the best ways to express oil on material to be treated is by pinching or folding the skin in an inverted V whereby the cells in the skin are ruptured and the essential oils fall onto the material to be treated. In actual practice, the length of the peel is ordinarily about half an inch, so that each leg of the V is about a quarter of an inch. These dimensions give excellent results, although of course I do not wish to be limited to the example given.

It is an object of this invention to express a large amount of oil from the peel economically and simply.

A further object of the invention is to direct the oil onto the object to be flavored or scented.

Yet another object of the invention is to provide an apparatus which is simple and cheap to manufacture and easy to repair and replace.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 4 is a top plan view of my device with the slidable member in opened position.

Figure 5 is a view taken along the line 5—5 of Figure 4, looking in the direction of the arrows.

Figure 6 is a view taken along the line 6—6 of Figure 5, looking in the direction of the arrows.

Figure 7 is a view along the line 7—7 of Figure 5, looking in the direction of the arrows.

Figure 8 is a top plan view of another form of my device.

Figure 9 is a view in side elevation of the form of device shown in Figure 8.

Figure 10 is a view along the line 10—10 of Figure 9, looking in the direction of the arrows.

Figure 11 is a view taken along the line 11—11 of Figure 10, looking in the direction of the arrows.

Figure 22 is a view partly in section, showing a peel at the finish of the expressing operation.

Figure 23 is a view similar to the view shown in Figure 22, showing the cutting off of the peel after the expressing operation.

Figure 24 is a view partly in section of a modification of the device illustrated in Figures 18 to 23, inclusive, showing a cut-off knife mounted on the stop.

Figure 25 is a view taken along the line 25—25 of Figure 24, looking in the direction of the arrows.

Figure 26 is a top plan view of another modified form of the device.

Figure 27 is a view in side elevation of the form shown in Figure 26.

Figure 28 is a view taken along the line 28—28 of Figure 27, looking in the direction of the arrows.

Figure 29 is a view taken along the line 29—29 of Figure 26, looking in the direction of the arrows.

Figure 30 shows in side elevation the position of the slidable member when the peel has been pinched into the inverted V.

Figure 31 shows in side elevation the position of the parts at the beginning of the operation of tearing off the used peel.

Figure 32 is a top plan view of another modified form of my device.

Figure 33 is a view taken along lines 33—33 of Figure 32.

Figure 34 is a view taken along lines 34—34 of Figure 33.

Figure 35 is a fragmentary view showing the peel grasped between the support and the shaping member.

Figure 36 shows in side elevation the position of the slidable member when the peel has been pinched into the inverted V.

Figure 37 shows in side elevation the position of the parts at the beginning of the operation of tearing off the used peel.

Figure 1:
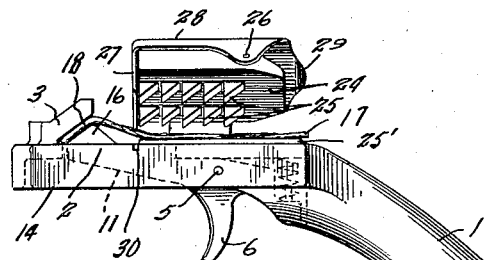
Figure 1 is a side elevation of my device with the sliding member pivoted back.

Referring to the drawings, I have shown a pistol grip 1 and a support 2. On the support 2 is mounted a stop member 3 which is slanted at some convenient angle with the upper surface of the support 2. The angle shown in the drawings is approximately 45°. Apertures are provided at 4 in the support 2 through which the expressed essential oil from the fruit peel can be dropped into the cocktail or on the other material to be flavored or scented.

Mounted in the support 2 is a pivot 5 on which is pivoted a trigger 6 which is provided with a rear support 7 carrying an upwardly projecting pin 8 over which one end of a helical spring 9 fits.

The upper end of the helical spring 9 fits into an aperture 10 formed on the bottom of the support 2. The helical spring 9 holds the parts normally in the position shown in Figure 5. The trigger 6 is formed with a forward support member 11 which has a shoulder 12 that fits over a shoulder 13 formed in the support 2. The support 2 is provided with a downwardly extending protecting flange 14 which protects the support 11 and other operating parts from injury. The support 11 fits within a slot 15 formed in the upper surface of the support 2.

On the end of the support 11 which is attached to the trigger 6 is a shaping member 16. This shaping member 16, as clearly shown in Figure 1, is adapted to bend the peel 17 upward as indicated at 18.

There is provided a cut-away portion 20 at the side of the support 2. In this cut-away portion 20 is adapted to lie a pivot pin 21. The pivot pin 21 is surrounded by a helical spring 22 which is adapted to bear against a sliding block 23 to hold the sliding block 23 in the position shown in Figure 4. On the sliding block 23 and preferably integrally formed therewith is a slidable member 24 which is provided on its under surface with gripping elements 25 which form a gripping surface above tracks 25′ formed on the support 2.

A knife element is pivoted at 26 on the slidable member 24. This knife element is provided with a broad knife edge 27 and a top 28. The top 28 is provided with an operating extension 29 which permits the knife to be pivoted on the pivot 26.

Figure 2:
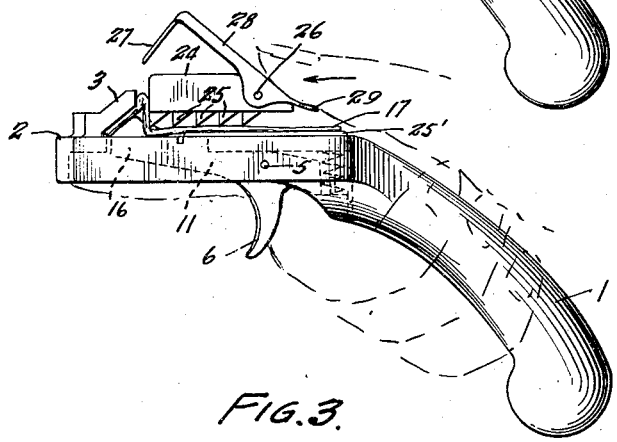
Figure 2 is a side elevation of my device with the slidable member pivoted down, the peel in position being squeezed. The position of the hand is shown.
Figure 3:
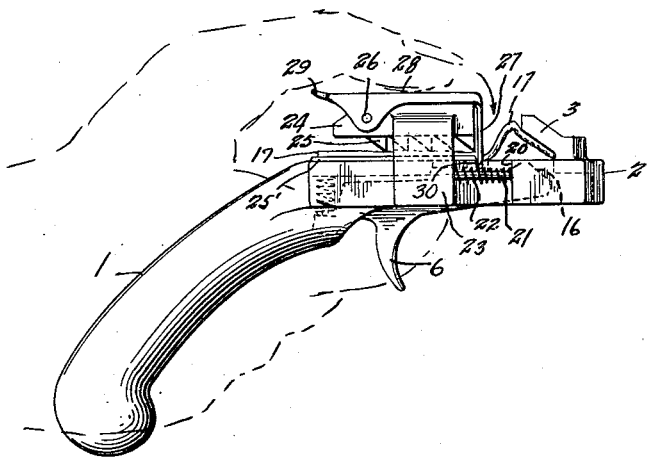
Figure 3 is a view showing cutting off of a used peel, the device being shown in side elevation.
Figure 12:
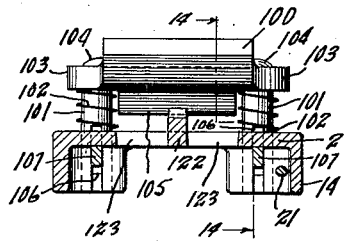
Figure 12 is a view taken along the line 12—12 of Figure 8, looking in the direction of the arrows.
Figure 13:
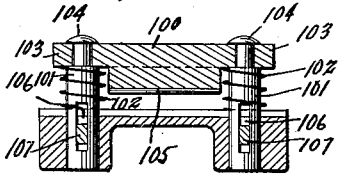
Figure 13 is a view taken along the line 13—13 of Figure 8, looking in the direction of the arrows.
Figure 14:
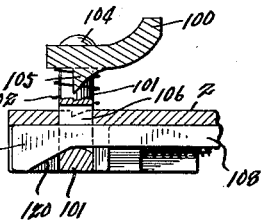
Figure 14 is a view taken along the line 14—14 of Figure 12, looking in the direction of the arrows.
Figure 15:
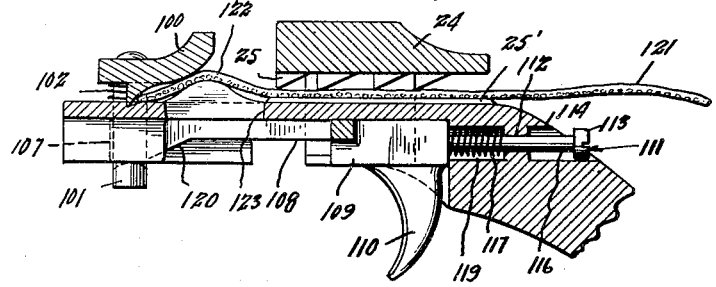
Figure 15 is a view partly in section, showing the position of the parts and of the fruit peel at the beginning of the expressing operation.

In operation, the slidable member 24 is pivoted back on the pivot 21 in the position shown in Figure 1 and a fruit peel with the outside down is placed in position, as shown in Figure 1, over the shaping member 16. The slidable member is now pushed down in the position shown in Figure 2 and pushed forward with the thumb against the pressure of the spring 22. After expressing oil, the trigger 6 is pulled rearwardly, thus lowering the support 11 and the shaping member 16. The expressed oil falls down through the aperture 4 onto the material to be treated. The parts are then permitted, under the pressure of the spring 22, to resume the position shown, for instance, in Figure 3, where the knife 27 is lowered into a slot 30 to cut off the peel.

The process can be continued until the length of peel is entirely used up. The inverted V shape of the peel breaks up the cells in the skin of the peel and the essential oils are squirted down with considerable force through the aperture 4 onto the material to be treated.

In the form of invention shown in Figures 8 to 17, inclusive, I have shown a similar support 2 and handle 1; also a similar slidable member 24. However, the stop member is movable upward and downward and carries with it a cutoff knife. Moreover, the trigger arrangement is different than in the form just described.

I have shown in Figures 8 to 17 a form of device having a stop member 100 mounted on posts 101 surrounded by compression springs 102 which bear at one end on top of the support 2 and at the other end on the lower part of ears 103 formed on the stop member 100. The posts 101 may be riveted as indicated at 104 to the ears 103.

Between the posts 101 is mounted a cut-off knife 105.

Each post 101 is provided with a slot 106 through which fit cam arms 107 of a bifurcated member 108 which is attached to a trigger block 109. The trigger block 109 is provided with a trigger 110. Screwed into the block 109 is a screw 111 which passes through an aperture 112 formed on the top part of the pistol grip handle 1. The screw head 113 is adapted to slide in a larger aperture 114 formed in the top of the pistol grip handle 1. The screw 111 has a reduced portion 115 which is screwed into the pistol block 109, and a smooth portion 116, and there is a helical compression spring 117 which surrounds the screw. The screw and the spring lie within apertures 118 and 119 formed in the support 2.

Upon pulling with the index finger on the trigger element 110, the spring 117 is compressed to pull back the block 109 and with it the bifurcated member 108 which carries the cam arms 107. Cam arms 107 are provided with cam surfaces 120 which bear against the bottom of the slots 106, pulling down the posts 101 against the tension of the springs 102 so that the stop 100 assumes the position shown in Figures 15 and 16.

Figure 16:
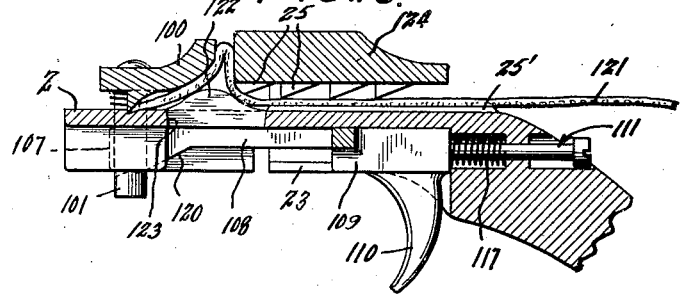
Figure 16 is a view similar to Figure 15, showing the position of the parts and of the peel at the finish of the expressing operation.
Figure 17:
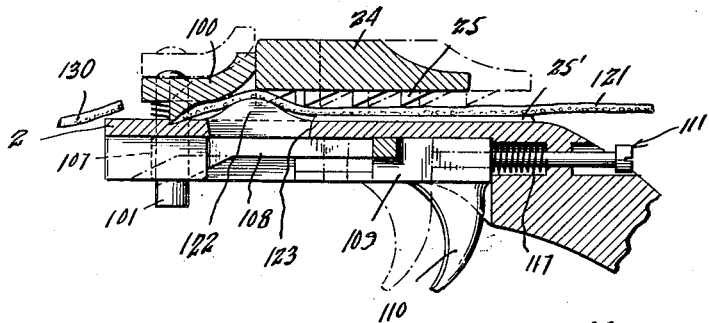
Figure 17 is a view similar to Figure 16, showing the position of the parts at the end of the operation.
Figure 18:
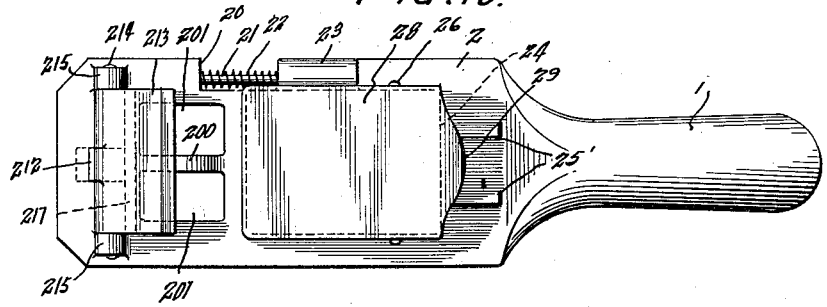
Figure 18 is a top plan view of another form of my device.
Figure 19:
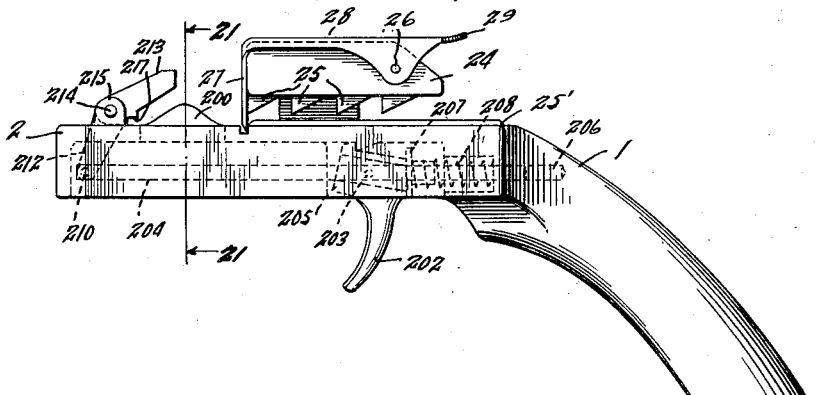
Figure 19 is a view in side elevation of the form shown in Figure 18.
Figure 20:
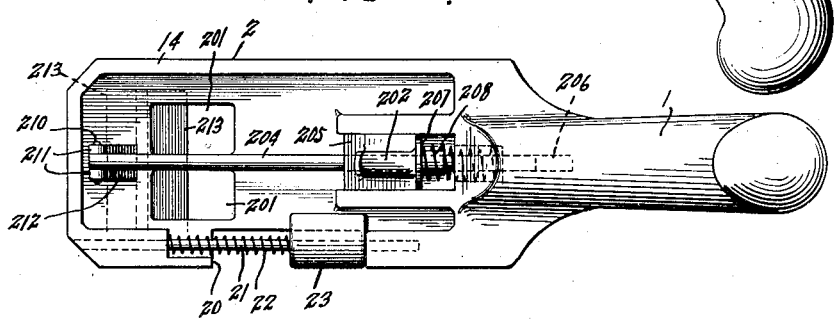
Figure 20 is a bottom plan view of this modification.
Figure 21:
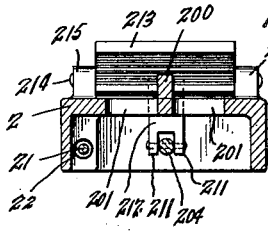
Figure 21 is a view taken along the line 21—21 of Figure 19, looking in the direction of the arrows.

A strip of peel 121 can be pushed forward by the slidable member 24 and pinched into the desired inverted V as indicated in Figure 16.

In this form of the invention, the shaping member is immovable and is indicated at 122. Apertures 123 are formed on either side of the shaping member and permit the essential oils to be expressed onto the material which it is desired to flavor or scent.

After the oil has been expressed, the trigger 110 may be released, as indicated in dotted lines in Figure 17, and the trigger again pulled back to cut off a piece 130 of the peel. The slidable member 24 is returned by the spring and a new piece of peel subjected to the expressing operation.

In the form of invention shown in Figures 18 to 23, inclusive, I have shown the pistol grip handle 1, the support 2, and the slidable member 24 with the gripping element 25. The slidable element 24 is provided with the knife construction 28 such as is shown in the form illustrated in Figures 1 to 7 inclusive. A permanent shaping member 200 is shown in the top of the support 1 and apertures 201 through which the essential oils may fall.

The trigger construction and the stop construction are different from any of the forms heretofore shown. I have illustrated a trigger 202 which is pivoted at 203 on a rod 204. The trigger is provided with a bored upper portion 205 which permits the trigger to rock on the pivot 203 on the rod 204. The rod 204 is journaled in a socket 206 at the top of the pistol grip 1.

A stop collar 207 is provided on the rod 204 and a helical spring 208 bears at one end on the stop collar 207 and on the other end against the end of a cylindrical aperture 209 formed at the extremity of the support 2.

The rod 204 has a pivot 210 passing through it. The pivot 210 passes through bifurcated arms 211 formed in a lever element 212 which is attached to a stop 213 forming a bell crank with the stop 213. The center of this bell crank is pivoted at 214 in supports 215 formed on the upper surface of the support 2. The arm 212 is adapted to rotate within an aperture 216 formed in the upper surface of the support 2.

The stop 213 is provided with a shoulder 217 which is adapted to grip an end 218 of a piece of peel, as indicated in Figure 22.

The cylindrical section 205 formed at the top of the trigger 202 has provided a lug 219 which engages a stop 220 formed on the lower surface of the support 2. Normally, the parts are in the position shown in Figure 22, wherein the collar 207 by reason of its engagement with an inclined surface 221 formed on the cylindrical element 205 holds the cylindrical element 205 in the cocked position indicated in Figure 22 where the lug 219 engages the catch 220. This position of the parts locks the stop 213 in the position shown, and by pushing forward on the slidable element 24, the peel may be brought into the V form shown in Figure 22, and the essential oils expressed down through the apertures 201.

Upon pulling the trigger 202, the spring 208 is compressed. Lug 219 no longer engages catch 220, and the parts can be brought into the position shown in Figure 23, which releases the hold on the end 218 of the peel. The knife 27 can then be lowered to cut off the peel. A new piece of peel may be slid in position while the trigger 202 is still pulled back, and the operation can be repeated.

In Figures 24 and 25 I have shown a somewhat similar form to that just described, except that there is no knife provided on the slidable member 24, but the stop 213 is provided with a knife blade 300 which is brought down when the spring 208 presses the cylindrical trigger member 205 forward.

The knife 300 is adapted to enter an aperture 301 formed in the upper surface of the support 2. In this form of device, I have shown the stop 213 as provided with operating arms 302 which are bifurcated at their ends 303. Through the bifurcations extend pivots 304 which pass through arms 305 which are formed as arms joined to a connecting rod 306 which connects with the rod 204.

I have shown another form of my device in Figures 26 to 31 inclusive. In this form I have shown a support, stop and grip mechanism similar to the type shown in Figures 1 to 7 inclusive. In this form the support 2 is formed with grooves 400 cut in its upper surface, thus forming ridges 401 on which the peel 17 is adapted to slide. The sliding member 24 is substantially the same as in the form shown in Figures 1 to 7 inclusive but it is to be noted that the first row of teeth 25 is omitted from the bottom of the sliding member 24. The device is found to work better, under certain conditions, when these teeth 25 do not come too close to the front edge of the sliding member 24.

In this form of device the trigger 6 is provided with a forward support 402 which terminates in a shaping member 403. The shaping member 403 is cut away at the bottom, as indicated at 404. This cut-away portion is of considerable value, in that it prevents wastage of the expressed oils, since there is no surface below 404 for them to collect.

Further, it is to be noted that the device is generally made with just enough clearance to insert the end of the peel beneath the shaping member 403 and the stop 3. The spring 9 holds the peel in position to prevent it from backing away whereby the travel of the sliding member makes a correct fold of the peel. If the peel were not held firmly between the stop and the shaping member, there would be a tendency for the peel to back away, and the device would function improperly.

A further improvement of this form consists in a cut-away portion 405 formed at the front of the slidable member 24. This provides for a fit between the slidable member 24 and the shaping member 403 so that the peel will not be broken. Too tight a fit tends to break the peel.

In this form of device it is to be noted that I have provided a thumb rest 406 which is pivoted at 407 on the slidable member 24. The thumb rest 406 is provided with a hollowed out portion 408 for the receipt of the thumb of the user. A stop 409 is provided at the front of the thumb rest 406.

In the beginning of the forward pushing operation, the support 409 is in contact with the top surface of the support 24. As the support 24 is pushed further forward, the thumb rest 406 is tilted backward, as indicated in the drawings. The position of the parts when the peel is being squeezed between the support 24 and the stop 3 is illustrated in Figure 30.

In Figure 31 there is illustrated the position of the parts and the peel 17 when the used portion of the peel is being discarded.

In Figure 31 the portion of the peel which lay under the support 24 has been pulled out. The support 24 has been pushed against the stop and a used portion of the peel can be ripped off from the main portion of the peel. In this form of device, no cut-off knife is used, as it has been found feasible to tear off the used peel, as illustrated in Figure 31.

There is shown in Figures 32 to 37, inclusive, another modification of my device. In this form, the support, stop and grip mechanism is similar to that shown in Figures 26 to 31. However, the trigger arrangement is different from any of the forms heretofore described.

In this construction, the trigger is made of two pieces and works on a different principle of operation from those hereinbefore described.

The trigger 6 is provided at its upper end with a protrusion 410 which fits into a recessed area 411 formed in the forward support member 402. As clearly shown in Fig. 33, the support member 402 has an extension 413 which projects into the cut-away portion 414 in member 2. A pin or the like 415 serves to support the extension 413 within the cut-away portion.

The forward support element 402 is provided with a shoulder 416. As best illustrated in Fig. 33, the shoulder 416 abuts against the shoulder 417 on the support 2 and will thereby tend to limit the rearward movement of the member 402 when in inoperative position.

The trigger 6 is pivotally mounted immediately in back of the aperture 4 on a pivot pin 418. The pivot pin 418 is journaled in lugs 419 and 420, respectively. A coil spring 421 is fitted around pin 418 and one end thereof is suitably secured to the trigger 6. The other extremity of the spring is affixed to the lug 420. It will be readily appreciated that the trigger 6 and the forward support 402 will be normally held in the position shown in Fig. 33 by the action of the coil spring.

The operation of the device is simple. By merely squeezing on the trigger 6, the shaping member 403 is advanced toward the stop 3. It will of course be appreciated that the shaping member will move in a direction substantially perpendicular to the stop 3. This is particularly efficacious as the peel 17 will be very tightly held between the two members.

While I have shown and described the preferred embodiments of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A method of expressing essential oils from fruit skins onto material to be treated comprising supporting the skin above the material on a support with the outside of the skin down, giving the skin an initial upward bend, and extracting the oils by folding the skin on itself in said initial bend, and maintaining a free path for the oils from the support to the material.

2. The method of expressing oil from fruit skin comprising holding one end of a strip of peel against a stop while advancing a predetermined section of peel in the direction of the stop so that the peel is folded in the form of a V to express the oil and to cause the particles of oil to flow in a predetermined direction.

MELVILLE D. TRUESDALE.